(12) United States Patent
Mao et al.

(10) Patent No.: US 9,099,126 B2
(45) Date of Patent: Aug. 4, 2015

(54) SYSTEM AND METHOD OF FORMING SPACER STRUCTURES USING ULTRA NARROW MAGNETIC HEAD FABRICATION

(71) Applicant: HGST Netherlands B.V., Amsterdam (NL)

(72) Inventors: Guomin Mao, San Jose, CA (US); Yi Zheng, San Ramon, CA (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 13/954,791

(22) Filed: Jul. 30, 2013

(65) Prior Publication Data

US 2015/0036244 A1 Feb. 5, 2015

(51) Int. Cl.
*G11B 5/31* (2006.01)
*G11B 5/39* (2006.01)

(52) U.S. Cl.
CPC ............ *G11B 5/3932* (2013.01); *G11B 5/3163* (2013.01)

(58) Field of Classification Search
CPC ........... G11B 5/31; G11B 5/3109; G11B 5/39
USPC ............. 360/125.11, 125.12, 125.09, 125.02, 360/125.07, 125.08, 125.15, 324.11, 324.12
See application file for complete search history.

(56) References Cited

U.S. PATENT DOCUMENTS

| | | | | |
|---|---|---|---|---|
| 7,602,589 | B2 * | 10/2009 | Freitag et al. | 360/324.11 |
| 7,691,434 | B1 | 4/2010 | Zhang et al. | |
| 8,031,442 | B2 * | 10/2011 | Pinarbasi | 360/324.1 |
| 8,037,593 | B2 | 10/2011 | Ho et al. | |
| 8,599,520 | B1 * | 12/2013 | Liu et al. | 360/324.1 |
| 2006/0273066 | A1 | 12/2006 | Bedell et al. | |
| 2007/0268631 | A1 * | 11/2007 | Guo et al. | 360/324 |
| 2008/0055794 | A1 * | 3/2008 | Freitag et al. | 360/324.12 |
| 2008/0088985 | A1 * | 4/2008 | Driskill-Smith et al. | 360/324.2 |
| 2009/0034126 | A1 * | 2/2009 | Pinarbasi | 360/235.4 |
| 2011/0089139 | A1 | 4/2011 | Hong | |
| 2011/0089140 | A1 | 4/2011 | Hong | |
| 2012/0127615 | A1 | 5/2012 | Hong et al. | |

OTHER PUBLICATIONS

Childress et al., "Fabrication and Recording Study of All-Metal Dual-Spin-Valve CPP Read Heads," INTERMAG 2006, pp. 277.
Wu et al., "High Density Magnetic Data Storage: Chapter 1," World Scientific Publishing Co. Pte. Ltd., Principle, Technology, and Materials, Apr. 2009, pp. 1-68.

* cited by examiner

*Primary Examiner* — Allen T Cao
(74) *Attorney, Agent, or Firm* — Zilka-Kotab, PC (57) ABSTRACT

A magnetic head, according to one embodiment, includes a sensor structure extending from an air bearing surface end thereof in a stripe height direction, the sensor structure having sidewalls on opposite sides thereof, the sidewalls extending between a top and a bottom of the sensor structure, the sidewalls extending in the stripe height direction, wherein a spacing between the sidewalls in a track width direction along the top of the sensor structure is about constant therealong in the stripe height direction.

18 Claims, 7 Drawing Sheets

SYSTEM AND METHOD OF FORMING SPACER STRUCTURES USING ULTRA NARROW MAGNETIC HEAD FABRICATION

FIELD OF THE INVENTION

The present invention relates to data storage systems, and more particularly, this invention relates to magnetic heads having improved sensor structures and methods of forming thereof.

BACKGROUND

The heart of a computer is a magnetic hard disk drive (HDD) which typically includes a rotating magnetic disk, a slider that has read and write heads, a suspension arm above the rotating disk and an actuator arm that swings the suspension arm to place the read and/or write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

The volume of information processing in the information age is increasing rapidly. In particular, it is desired that HDDs be able to store more information in their limited area and volume. A technical approach to this desire is to increase the capacity by increasing the recording density of the HDD. To achieve higher recording density, further miniaturization of recording bits is effective, which in turn typically requires the design of smaller and smaller components.

The further miniaturization of the various components, however, presents its own set of challenges and obstacles. Particularly, the miniaturization of read sensors in conventional products is limited by the processes currently used to form such components. The large sensor structures found in conventional products have several detrimental effects to their performance; one of which includes overlapping of adjacent tracks while reading, thereby introducing noise and signal distortion. Additionally, the tall profile of conventional products results in undesirably long transition times while reading data.

However, in sharp contrast, various embodiments described and/or suggested herein include an improved sensor structure and methods of forming such sensor structures. Particularly, the sensor structures described below may implement a reduced width, narrower cross-sectional profile and more vertical sidewalls, thereby resulting in drastic improvements over the performance limitations of conventional products described immediately above.

SUMMARY

A magnetic head according to one embodiment includes a sensor structure extending from an air bearing surface end thereof in a stripe height direction, the sensor structure having sidewalls on opposite sides thereof, the sidewalls extending between a top and a bottom of the sensor structure, the sidewalls extending in the stripe height direction, wherein a spacing between the sidewalls in a track width direction along the top of the sensor structure is about constant therealong in the stripe height direction.

A magnetic head according to another embodiment includes a sensor structure extending from an air bearing surface end thereof in a stripe height direction, the sensor structure having sidewalls on opposite sides thereof, the sidewalls extending between a top and a bottom of the sensor structure, the sidewalls extending in the stripe height direction, wherein a line edge roughness of at least one of the sidewalls of the sensor structure is less than about 1.5 nm.

A method according to one embodiment includes forming a polymer mask with a line edge roughness of less than about 1.5 nm above a substrate, the substrate including a thin film stack of sensor materials and a milling mask layer, depositing a spacer film above the polymer mask and exposed portions of the substrate using a conformal deposition process, performing a first subtractive process to define a spacer from the spacer film, performing a second subtractive process to define a milling mask from the milling mask layer using the spacer, performing a third subtractive process to define a sensor structure from the thin film stack of sensor materials using the milling mask.

Any of these embodiments may be implemented in a magnetic data storage system such as a disk drive system, which may include a magnetic head, a drive mechanism for passing a magnetic medium (e.g., hard disk) over the magnetic head, and a controller electrically coupled to the magnetic head.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of disk-based storage systems and/or related systems and methods, as well as operation and/or component parts thereof. Various embodiments described herein include an improved sensor structure and methods of forming such sensor structures. The improved sensor structures allow for more efficient read operations of the corresponding magnetic heads, depending on the desired embodiment. Particularly, the reduced width, narrower cross-sectional profile and more vertical sidewalls of the sensor structures described below allow for improved functionality of a magnetic head, as will be discussed in further detail below.

In one general embodiment, a magnetic head includes a sensor structure extending from an air bearing surface end thereof in a stripe height direction, the sensor structure having sidewalls on opposite sides thereof, the sidewalls extending between a top and a bottom of the sensor structure, the sidewalls extending in the stripe height direction, wherein a spacing between the sidewalls in a track width direction along the top of the sensor structure is about constant therealong in the stripe height direction.

In another general embodiment, a magnetic head includes a sensor structure extending from an air bearing surface end thereof in a stripe height direction, the sensor structure having sidewalls on opposite sides thereof, the sidewalls extending between a top and a bottom of the sensor structure, the sidewalls extending in the stripe height direction, wherein a line edge roughness of at least one of the sidewalls of the sensor structure is less than about 1.5 nm.

In yet another general embodiment, a method includes forming a polymer mask with a line edge roughness of less than about 1.5 nm above a substrate, the substrate including a thin film stack of sensor materials and a milling mask layer, depositing a spacer film above the polymer mask and exposed portions of the substrate using a conformal deposition process, performing a first subtractive process to define a spacer from the spacer film, performing a second subtractive process to define a milling mask from the milling mask layer using the spacer, performing a third subtractive process to define a sensor structure from the thin film stack of sensor materials using the milling mask.

Figure 1:
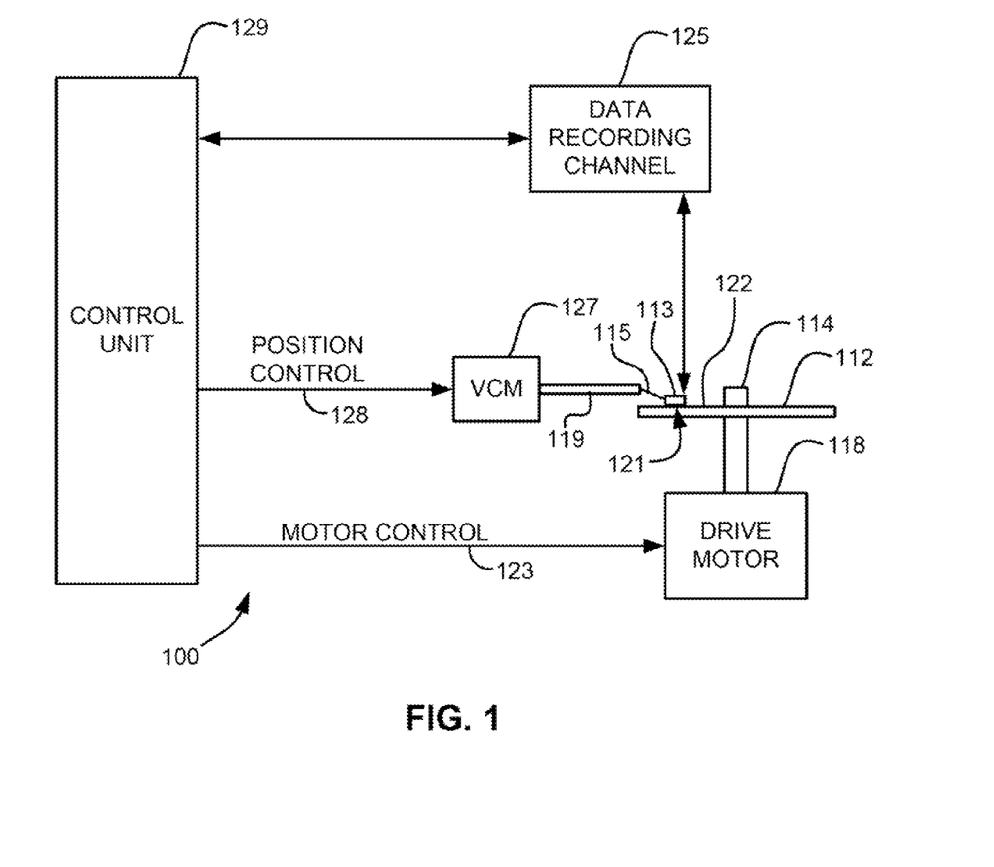
FIG. 1 is a simplified drawing of a magnetic recording disk drive system.

Referring now to FIG. 1, there is shown a disk drive 100 in accordance with one embodiment of the present invention. As shown in FIG. 1, at least one rotatable magnetic medium (e.g., magnetic disk) 112 is supported on a spindle 114 and rotated by a drive mechanism, which may include a disk drive motor 118. The magnetic recording on each disk is typically in the form of an annular pattern of concentric data tracks (not shown) on the disk 112. Thus, the disk drive motor 118 preferably passes the magnetic disk 112 over the magnetic read/write portions 121, described immediately below.

At least one slider 113 is positioned near the disk 112, each slider 113 supporting one or more magnetic read/write portions 121, e.g., of a magnetic head according to any of the approaches described and/or suggested herein. As the disk rotates, slider 113 is moved radially in and out over disk surface 122 so that portions 121 may access different tracks of the disk where desired data are recorded and/or to be written. Each slider 113 is attached to an actuator arm 119 by means of a suspension 115. The suspension 115 provides a slight spring force which biases slider 113 against the disk surface 122. Each actuator arm 119 is attached to an actuator 127. The actuator 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of disk 112 generates an air bearing between slider 113 and disk surface 122 which exerts an upward force or lift on the slider. The air bearing thus counter-balances the slight spring force of suspension 115 and supports slider 113 off and slightly above the disk surface by a small, substantially constant spacing during normal operation. Note that in some embodiments, the slider 113 may slide along the disk surface 122.

The various components of the disk storage system are controlled in operation by control signals generated by controller 129, such as access control signals and internal clock signals. Typically, control unit 129 comprises logic control circuits, storage (e.g., memory), and a microprocessor. In a preferred approach, the control unit 129 is electrically coupled (e.g., via wire, cable, line, etc.) to the one or more magnetic read/write portions 121, for controlling operation thereof. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Read and write signals are communicated to and from read/write portions 121 by way of recording channel 125.

The above description of a typical magnetic disk storage system, and the accompanying illustration of FIG. 1 is for representation purposes only. It should be apparent that disk storage systems may contain a large number of disks and actuators, and each actuator may support a number of sliders.

An interface may also be provided for communication between the disk drive and a host (integral or external) to send and receive the data and for controlling the operation of the disk drive and communicating the status of the disk drive to the host, all as will be understood by those of skill in the art.

In a typical head, an inductive write portion includes a coil layer embedded in one or more insulation layers (insulation stack), the insulation stack being located between first and second pole piece layers. A gap is formed between the first and second pole piece layers by a gap layer at an air bearing surface (ABS) of the write portion. The pole piece layers may be connected at a back gap. Currents are conducted through the coil layer, which produce magnetic fields in the pole pieces. The magnetic fields fringe across the gap at the ABS for the purpose of writing bits of magnetic field information in tracks on moving media, such as in circular tracks on a rotating magnetic disk.

The second pole piece layer has a pole tip portion which extends from the ABS to a flare point and a yoke portion which extends from the flare point to the back gap. The flare point is where the second pole piece begins to widen (flare) to form the yoke. The placement of the flare point directly affects the magnitude of the magnetic field produced to write information on the recording medium.

Figure 2A:
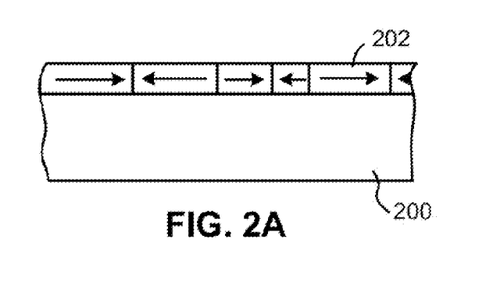
FIG. 2A is a schematic representation in section of a recording medium utilizing a longitudinal recording format.

FIG. 2A illustrates, schematically, a conventional recording medium such as used with magnetic disc recording systems, such as that shown in FIG. 1. This medium is utilized for recording magnetic impulses in or parallel to the plane of the medium itself. The recording medium, a recording disc in this instance, comprises basically a supporting substrate 200 of a suitable non-magnetic material such as glass, with an overlying coating 202 of a suitable and conventional magnetic layer.

Figure 2B:
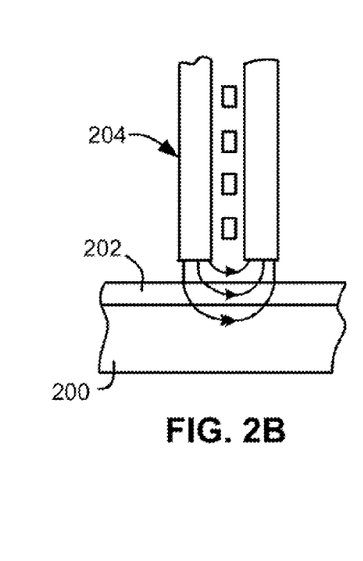
FIG. 2B is a schematic representation of a conventional magnetic recording head and recording medium combination for longitudinal recording as in FIG. 2A.

FIG. 2B shows the operative relationship between a conventional recording/playback head 204, which may preferably be a thin film head, and a conventional recording medium, such as that of FIG. 2A.

Figure 2C:
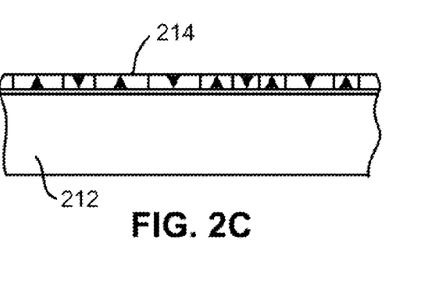
FIG. 2C is a magnetic recording medium utilizing a perpendicular recording format.

FIG. 2C illustrates, schematically, the orientation of magnetic impulses substantially perpendicular to the surface of a recording medium as used with magnetic disc recording systems, such as that shown in FIG. 1. For such perpendicular recording the medium typically includes an under layer 212 of a material having a high magnetic permeability. This under layer 212 is then provided with an overlying coating 214 of magnetic material preferably having a high coercivity relative to the under layer 212.

Figure 2D:
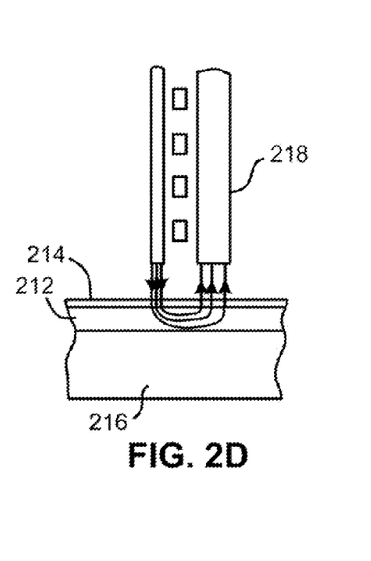
FIG. 2D is a schematic representation of a recording head and recording medium combination for perpendicular recording on one side.

FIG. 2D illustrates the operative relationship between a perpendicular head 218 and a recording medium. The recording medium illustrated in FIG. 2D includes both the high permeability under layer 212 and the overlying coating 214 of magnetic material described with respect to FIG. 2C above. However, both of these layers 212 and 214 are shown applied to a suitable substrate 216. Typically there is also an additional layer (not shown) called an "exchange-break" layer or "interlayer" between layers 212 and 214.

In this structure, the magnetic lines of flux extending between the poles of the perpendicular head 218 loop into and out of the overlying coating 214 of the recording medium with the high permeability under layer 212 of the recording medium causing the lines of flux to pass through the overlying coating 214 in a direction generally perpendicular to the surface of the medium to record information in the overlying coating 214 of magnetic material preferably having a high coercivity relative to the under layer 212 in the form of magnetic impulses having their axes of magnetization substantially perpendicular to the surface of the medium. The flux is channeled by the soft underlying coating 212 back to the return layer (P1) of the head 218.

Figure 2E:
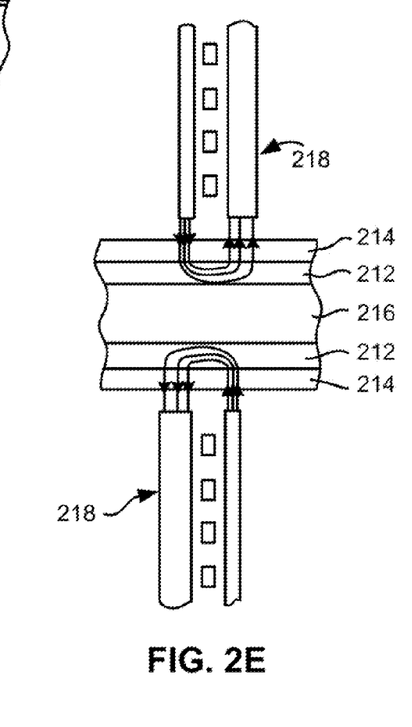
FIG. 2E is a schematic representation of a recording apparatus adapted for recording separately on both sides of the medium.

FIG. 2E illustrates a similar structure in which the substrate 216 carries the layers 212 and 214 on each of its two opposed sides, with suitable recording heads 218 positioned adjacent the outer surface of the magnetic coating 214 on each side of the medium, allowing for recording on each side of the medium.

Figure 3A:
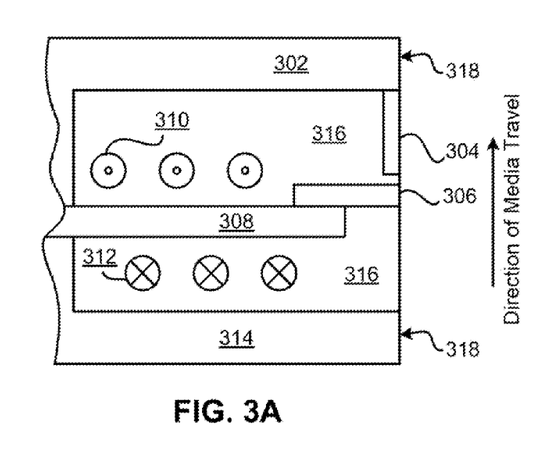
FIG. 3A is a cross-sectional view of one particular embodiment of a perpendicular magnetic head with helical coils.

FIG. 3A is a cross-sectional view of a perpendicular magnetic head. In FIG. 3A, helical coils 310 and 312 are used to create magnetic flux in the stitch pole 308, which then delivers that flux to the main pole 306. Coils 310 indicate coils extending out from the page, while coils 312 indicate coils extending into the page. Stitch pole 308 may be recessed from the ABS 318. Insulation 316 surrounds the coils and may provide support for some of the elements. The direction of the media travel, as indicated by the arrow to the right of the structure, moves the media past the lower return pole 314 first, then past the stitch pole 308, main pole 306, trailing shield 304 which may be connected to the wrap around shield (not shown), and finally past the upper return pole 302. Each of these components may or may not have a portion in contact with the ABS 318. The ABS 318 is indicated across the right side of the structure.

Perpendicular writing is achieved by forcing flux through the stitch pole 308 into the main pole 306 and then to the surface of the disk positioned towards the ABS 318.

Figure 3B:
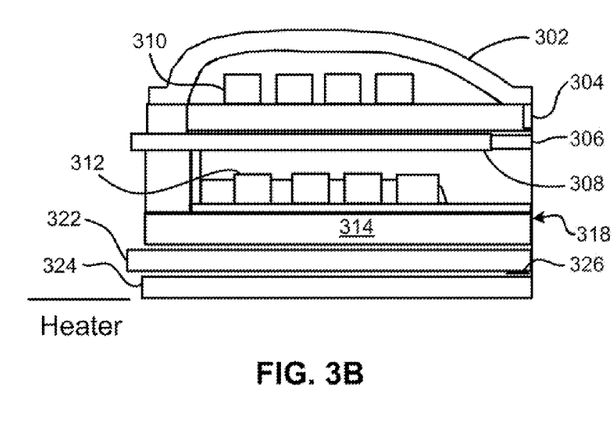
FIG. 3B is a cross-sectional view of one particular embodiment of a piggyback magnetic head with helical coils.

FIG. 3B illustrates a piggyback magnetic head having similar features to the head of FIG. 3A. Two shields 304, 314 flank the stitch pole 308 and main pole 306 of the magnetic write portion. Also the read sensor shields 322, 324 of the magnetic read portion are shown. The read sensor 326 is typically positioned between the sensor shields 322, 324.

Figure 4A:
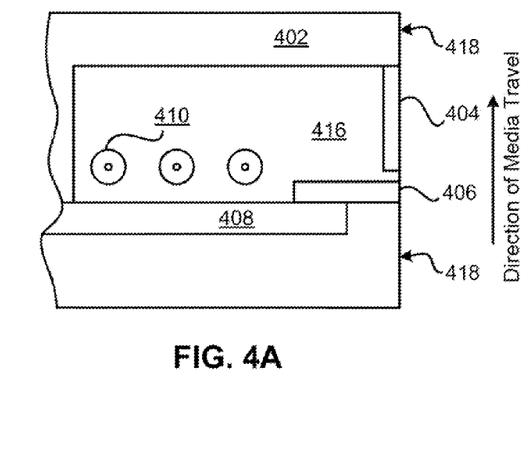
FIG. 4A is a cross-sectional view of one particular embodiment of a perpendicular magnetic head with looped coils.

FIG. 4A is a schematic diagram of one embodiment which uses looped coils 410, sometimes referred to as a pancake configuration, to provide flux to the stitch pole 408. The stitch pole then provides this flux to the main pole 406. In this orientation, the lower return pole is optional. Insulation 416 surrounds the coils 410, and may provide support for the stitch pole 408 and main pole 406. The stitch pole may be recessed from the ABS 418. The direction of the media travel, as indicated by the arrow to the right of the structure, moves the media past the stitch pole 408, main pole 406, trailing shield 404 which may be connected to the wrap around shield (not shown), and finally past the upper return pole 402 (all of which may or may not have a portion in contact with the ABS 418). The ABS 418 is indicated across the right side of the structure. The trailing shield 404 may be in contact with the main pole 406 in some embodiments.

Figure 4B:
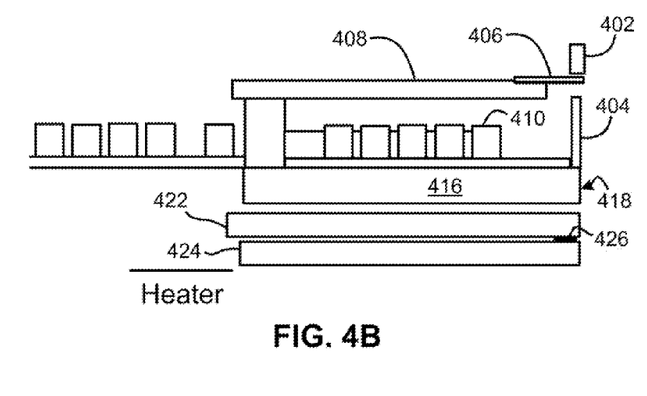
FIG. 4B is a cross-sectional view of one particular embodiment of a piggyback magnetic head with looped coils.

FIG. 4B illustrates another type of piggyback magnetic head having similar features to the head of FIG. 4A including a looped coil 410, which wraps around to form a pancake coil. Also, sensor shields 422, 424 of the magnetic read portion are shown. The read sensor 426 is typically positioned between the sensor shields 422, 424.

In FIGS. 3B and 4B, an optional heater is shown near the non-ABS side of the magnetic head. A heater (Heater) may also be included in the magnetic heads shown in FIGS. 3A and 4A. The position of this heater may vary based on design parameters such as where the protrusion is desired, coefficients of thermal expansion of the surrounding layers, etc.

As described above, various embodiments described herein include improved sensor structures. Any of the embodiments described and/or suggested above in relation to FIGS. 1-4B may include at least one such improved sensor structure according to any of the approaches described below.

Some of the sensor structures described herein preferably include sidewalls having a low line edge roughness (LER), about constant spacing between the sidewalls thereof (e.g., symmetric sidewalls), and/or a smaller width than conventionally achievable. As a result, the improved sensor structures of the various embodiments herein are able to perform more detailed read operations, e.g., read narrower data tracks, make sharper transitions when reading data, etc.

Figure 5A:
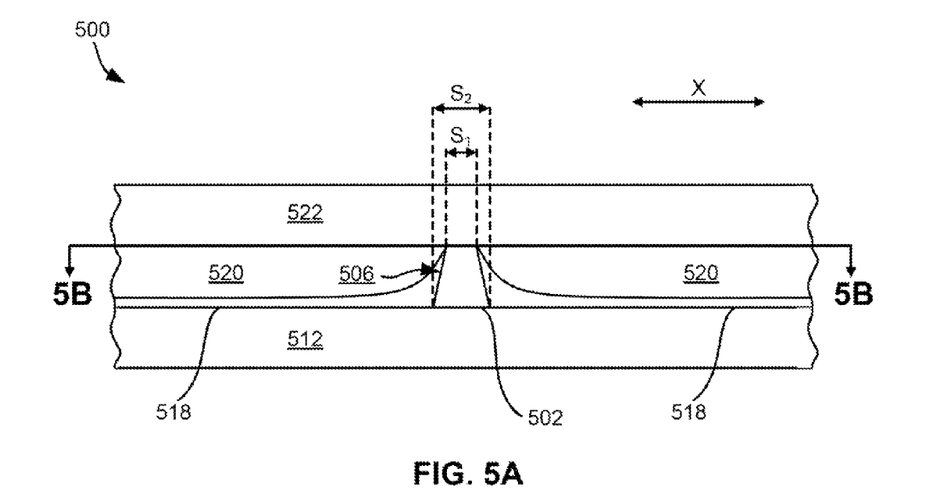
FIG. 5A is a partial cross-sectional view of a magnetic head according to one embodiment.
Figure 5B:
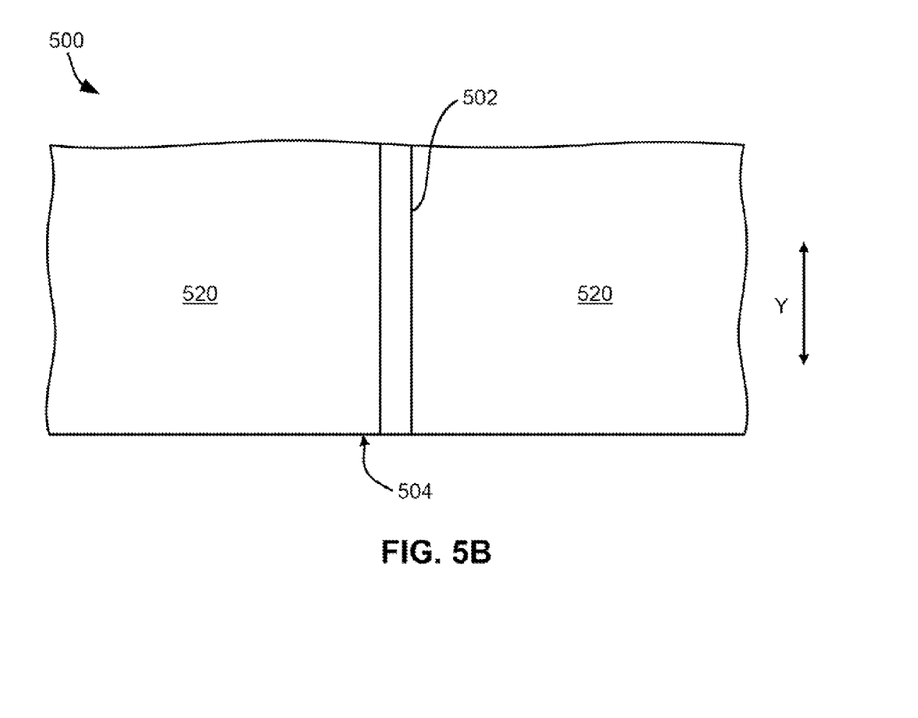
FIG. 5B is a partial top-down view of the magnetic head in FIG. 5A along line 5B-5B.

FIGS. 5A-5B depict a magnetic head 500, in accordance with one embodiment. As an option, the present magnetic head 500 may be implemented in conjunction with features from any other embodiment listed herein, such as those described with reference to the other FIGS. Of course, however, such magnetic head 500 and others presented herein may be used in various applications and/or in permutations which may or may not be specifically described in the illustrative embodiments listed herein. Further, the magnetic head 500 presented herein may be used in any desired environment.

Referring now to the illustrative embodiment depicted in FIGS. 5A-5B, the magnetic head 500, includes a sensor structure 502 positioned above a shield 512. According to one approach, which is in no way intended to limit the invention, an insulating layer 518, hard bias layer 520 and second shield 522 are formed thereabove. In various approaches, the insulating layer 518, hard bias layer 520 and second shield 522 may be formed using sputtering, chemical vapor deposition, plating, seed growth layers, etc., and/or any other process which would be apparent to one skilled in the art upon reading the present description. Moreover, any of the layers illustrated in FIGS. 5A-5B, including the sensor structure 502, may be of any type known in the art.

As illustrated, the sensor structure 502 preferably extends from an air bearing surface 504 end thereof in a stripe height direction Y. The sensor structure 502 also has sidewalls 506 on opposite sides thereof, where the sidewalls 506 may extend between a top and a bottom of the sensor structure 502. Furthermore, according to a preferred approach, the sidewalls 506 also extend in the stripe height direction Y.

As will be discussed in detail below with reference to FIGS. 6A-6F, a preferred process of forming a sensor structure may result in a minimized LER of the sidewalls of the sensor structure. Moreover, the lowered LER of the sidewalls of the sensor structure allows for improved uniformity of the spacing therebetween in addition to an overall narrower sensor structure, as will soon become apparent.

With continued reference to FIGS. 5A-5B, the spacing $S_1$, $S_2$ between the sidewalls 506 in a track width direction X along the top and bottom of the sensor structure 502 respectively, is preferably about constant therealong in the stripe height direction Y. Referring to the present description, "about constant" is intended to mean that the spacing between the sidewalls varies by no more than about 1 to about 2 nm therealong in the stripe height direction Y, depending on the designed spacing $S_1$, $S_2$, but may be higher or lower according to various approaches. For embodiments having narrower spacing $S_1$, $S_2$ between the sidewalls 506, it is desirable to minimize variation in spacing $S_1$, $S_2$ therealong in the stripe height direction Y, e.g., to optimize the magnetic signal reading performance. In various approaches, an average spacing between the sidewalls of the sensor structure 502 along an X-Y plane at any thickness level of the sensor (e.g., $S_1$, $S_2$ and/or any width therebetween) may be between about 3 nm and about 50 nm, but could be higher or lower depending on the desired embodiment.

As described above, sensor structures having uniform dimensions, e.g., widths in the width direction X, as measured at points therealong in the stripe height direction Y, allow for improved read performance. Additionally, smaller spacing between the sidewalls 506 allow for reading of narrower data tracks without interference from adjacent tracks caused by the sensor extending over such adjacent tracks of a given magnetic medium. Although sensor structures as described herein may be formed using various methods, FIGS. 6A-6F illustrate preferred process steps of a method for forming a sensor structure having improved functionality, e.g., such as the sensor structure 502 shown in FIGS. 5A-5B, according to an exemplary embodiment.

FIGS. 6A-6F depict process steps of a method for forming a magnetic head 600 having a sensor structure 502, in accordance with one embodiment. As an option, the present method for forming a magnetic head 600 may be implemented in conjunction with features from any other embodiment listed herein, such as those described with reference to the other FIGS. Of course, however, such method for forming a magnetic head 600 and others presented herein may be used in various applications and/or in permutations which may or may not be specifically described in the illustrative embodiments listed herein. Further, the method for forming a magnetic head 600 presented herein may be used in any desired environment. Thus FIGS. 6A-6F (and the other FIGS.) should be deemed to include any and all possible permutations.

Figure 6A:
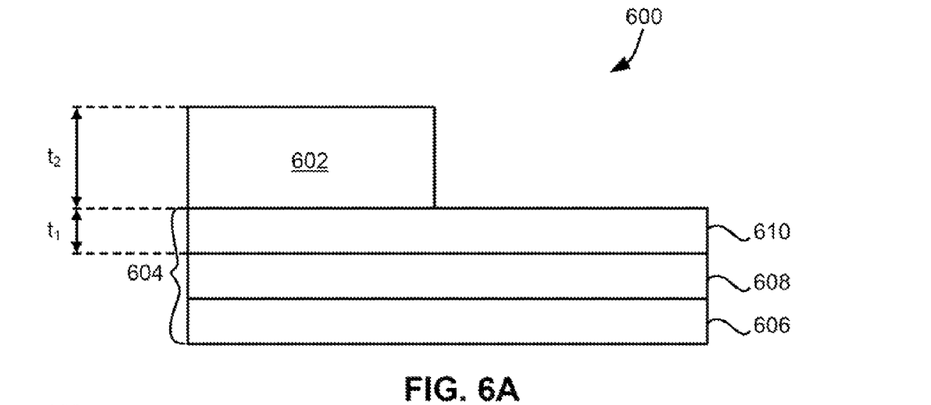
FIGS. 6A-6F are partial cross-sectional views corresponding to process steps of forming a magnetic head according to one embodiment.

Referring now to FIG. 6A, the method for forming the magnetic head 600 includes forming a polymer mask 602 above a substrate 604. As shown, the substrate 604 may include shield 606, a thin film stack of sensor materials 608 and a milling mask layer 610. In various approaches, the milling mask layer 610 may include carbon, a polymer-like carbon, silicon nitride, silicon dioxide, aluminum oxide, ruthenium, etc. In other approaches, the milling mask layer 610 may be laminated with silicon, tantalum oxide, tantalum, etc. depending on the desired embodiment. The laminate may act as a stop layer in some approaches, e.g., to stop a subtractive process before reaching the sensor materials 608.

In a preferred approach, the polymer mask 602 may have a LER of less than about 1.5 nm, more preferably less than about 1 nm, but could be higher or lower depending on the desired embodiment. As alluded to above, the LER of the foundational layers, e.g., the polymer mask 602, may be translated to the other layers later formed, thereby influencing the structure of the sensor structure 502. Thus, it is desirable that the polymer mask 602 have a reduced LER.

The polymer mask 602 may be formed by imprinting, e.g., using a patterned roller, stamper, etc. According to an exemplary approach, which is in no way intended to limit the invention, the polymer mask 602 may be formed by depositing a UV curable polymer (e.g., an acrylic) above the milling mask layer 610. Thereafter, a template may be used to imprint (press) the polymer into a desired shape whereby a light source may be used to cure the pressed polymer material to form the polymer mask 602. However, in various other approaches, the polymer mask 602 may be formed using any other method which may result in a desirable LER thereof.

As will be apparent to those skilled in the art, the polymer mask 602 may be formed of alternative materials known in the art, and that are amenable to sidewall definition by imprinting.

In one approach, the substrate 604 may include an additional layer (not shown) between the milling mask layer 610 and the polymer mask 602, e.g., to protect the substrate 604 during the formation of the polymer mask 602. Exposed portions of the additional layer may preferably be removed before any of the other process steps depicted in FIGS. 6B-6F are performed, e.g., using a reactive ion etching (RIE) procedure, wet etch, etc. However, in some approaches, the additional layer may be removed at a later step, or not at all, depending on the desired embodiment.

In another approach, the milling mask layer 610 may be present in the substrate, e.g., to reduce stress thereof. Depending on the desired embodiment, the milling mask layer 610 may have a thickness $t_1$ from about 5 nm to about 100 nm, but could be higher or lower. Moreover, the polymer mask 602 may have a thickness $t_2$ from about 10 nm to about 100 nm, but may be higher or lower depending on the desired embodiment.

Figure 6B:
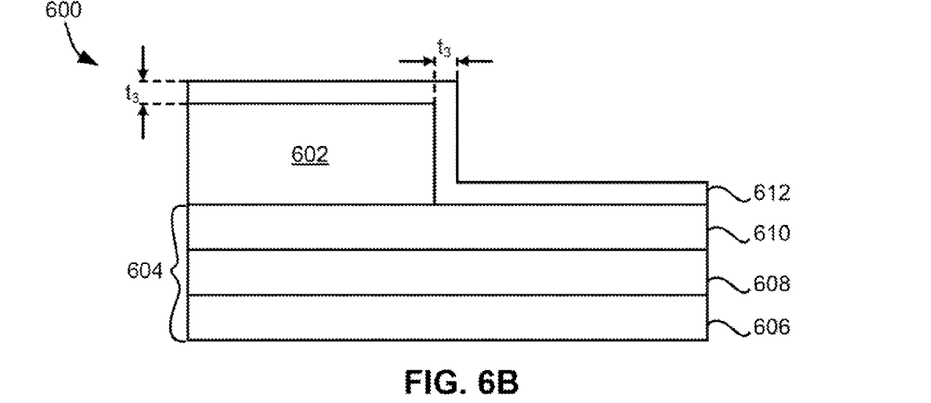

Now looking to FIG. 6B, the method also includes depositing a spacer film 612 above the polymer mask 602 and exposed portions of the substrate 604. According to various approaches, the spacer film 612 may include $SiOC_2$, AlOx, SiNx, TaOx, NiFe, Ru, tantalum nitride, titanium nitride, polysilicon, etc.

In a preferred approach, the spacer film 612 may be formed using a conformal deposition process, which may include using atomic layer deposition (ALD) and/or other such processes having the same or similar effects. As a result, the conformal deposition process may ensure an about constant thickness $t_3$ of the spacer film 612, as illustrated in FIG. 6B. According to various approaches, the spacer film 612 may have a thickness $t_3$ from about 5 nm to about 100 nm, more preferably from about 3 nm to about 50 nm, but may be higher or lower depending on the desired embodiment.

Additionally, by implementing a conformal deposition process, the spacer film 612 preferably has the same, or about the same, LER as the polymer mask 602. As described above, the uniform nature of a conformal deposition process to form the spacer film 612 may result in the low LER value of the polymer mask 602 being translated through the spacer film 612.

Figure 6C:
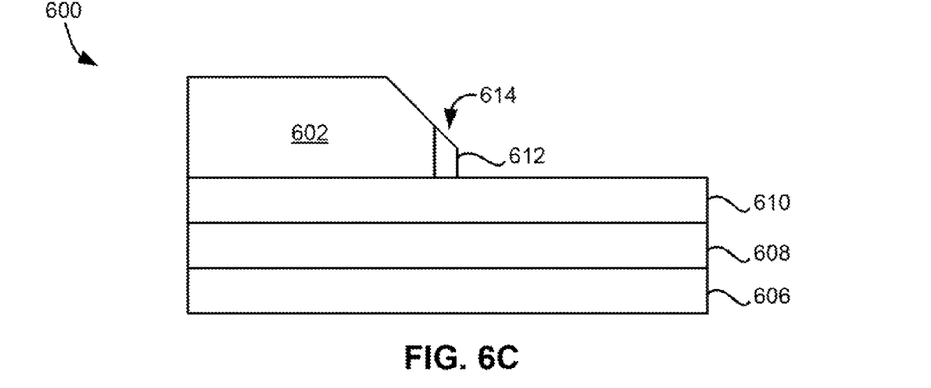
Figure 6D:
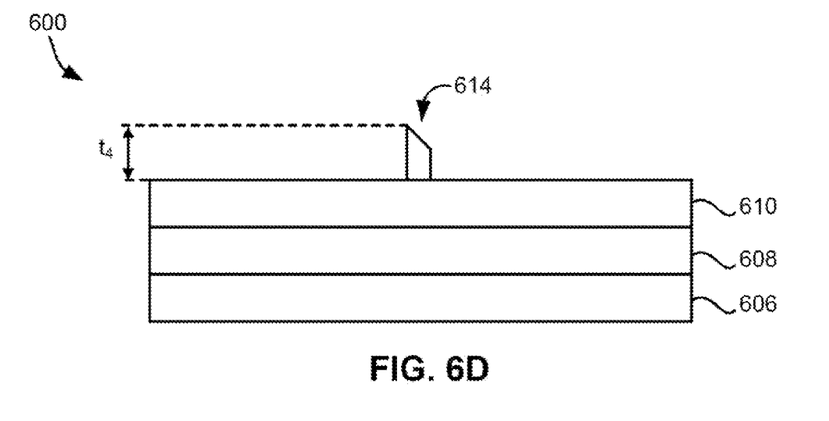

As shown in FIGS. 6C-6D, the method also includes performing a first subtractive process to define a spacer 614 from the spacer film 612. According to one approach, which is in no way intended to limit the invention, the first subtractive process may be twofold as suggested by FIGS. 6C-6D. However, according to other approaches, the first subtractive process may be performed in a single step, e.g., using a single subprocess.

Looking to FIG. 6C, at least some of the spacer film 612 and polymer mask 602 may be removed by a first step of the first subtractive process. According to various approaches, the first step of the first subtractive process may include a directional RIE procedure, e.g., using fluorocarbon plasma, chlorine, etc.; a directional milling procedure, e.g., using an ion beam; etc.

Furthermore, as shown in FIG. 6D, the remainder of the polymer mask 602 may be removed in a second step of the first subtractive process, thereby forming the spacer 614 from the spacer film 612. According to various approaches the second step of the first subtractive process may include an oxygen based plasma ash and/or strip (e.g., non-biased), N-Methyl Pyrrolidone (NMP), etc., and/or any of those listed above with reference to the first step of the first subtractive process.

Furthermore, the spacer 614 preferably retains the low LER of the previous spacer film 612, despite the first subtractive process. Thus in a preferred approach, the spacer 614 may have an LER value for at least one of its vertical sidewalls, more preferably each of its vertical sidewalls, of about 1.5 nm, more preferably about 1 nm. Moreover, according to various approaches, the thickness $t_4$ of the spacer 614 may be from about 3 nm to about 50 nm, but could be higher or lower depending on the desired embodiment.

The about constant thickness and low LER of the spacer 614 are desirable as they result in translation of the low LER to the milling mask 616 and a reduced amount of shadowing observed when forming sensor structure 502 as will be discussed in further detail below. Thus, the process steps illustrated in FIGS. 6A-6F may allow for a desirably smaller spacing between the sidewalls 506 of the sensor structure 502, in addition to about constant spacing $S_1$, $S_2$ thereof, as mentioned above.

Figure 6E:
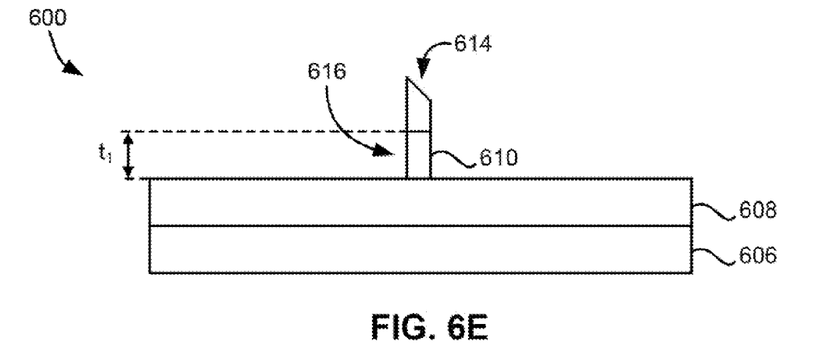

Referring now to FIG. 6E, the method for forming the magnetic head 600 also includes performing a second subtractive process to define a milling mask 616 from the milling mask layer 610. According to various approaches, the thickness $t_1$ of the milling mask 616 may be from about 3 nm to about 50 nm, but could be higher or lower depending on the desired embodiment.

According to a preferred approach, the spacer 614 may be used to perform the second subtractive process, e.g., define the milling mask 616. Thus, in one approach, the second subtractive process may include a RIE process. The RIE process may use an oxygen based RIE (e.g., O2, CO2, CO, etc., and/or combinations thereof) to transfer a mask pattern into the milling mask layer 610 if the mask layer 610 includes a carbon based material such as a polymer-like carbon, diamond-like carbon (DLC), polyimide, etc. In another approach, the RIE process may use a fluorocarbon based RIE (e.g., CF4, CHF3, etc., and/or combination thereof) to transfer a mask pattern into the milling mask layer 610 if the mask layer 610 includes a silicon based material such as silicon nitride, silicon dioxide, polysilicon, etc. In yet another approach, the RIE process may use a chlorine based RIE (e.g., $Cl_2$, $BCl_3$, etc. and/or combinations thereof) to transfer a mask pattern into the milling mask layer 610 if the mask layer 610 includes an aluminum based material such as aluminum oxide, alumina, etc. However, in different approaches, a mask pattern may be transferred into the milling mask layer 610 using other processes which would be apparent to one skilled in the art upon reading the present description.

According to different approaches, RIE tools equipped with both source and bias power suppliers, such as TCP9400DFM from Lam Research Inc. (Lam Research Corporation, 4650 Cushing Parkway, Fremont, Calif. 94538), or DPS from Applied Materials Inc. (Applied Materials, Inc., 2821 Scott Boulevard, Santa Clara, Calif. 95050, or Plasma-Therm's VERSALOCK etcher (Plasma-Therm, 10050 16th St N, St Petersburg, Fla. 33716), may be used with any of the RIE processes described above. The separate source and bias power control in these RIE tools allows a wider range of RIE processes to be performed, ranging from highly chemical processes to highly physical processes. Moreover, the Optical Emission Spectrometry (OES) endpoint system of these RIE tools allows to precisely control the over etch amount via the determination of etch endpoint.

Furthermore, the low LER value of the spacer 614 is translated onto the milling mask 616 during formation thereof. Thus in a preferred approach, the milling mask 616 may have an LER value for at least one of its sidewalls, more preferably each of its sidewalls, of about 1.5 nm or lower, more preferably about 1 nm or lower. In some approaches, the milling mask 616 may have an even lower LER value than that of the polymer mask 602 and/or spacer 614 as a result of the preferred process steps illustrated in FIGS. 6A-6F.

Figure 6F:
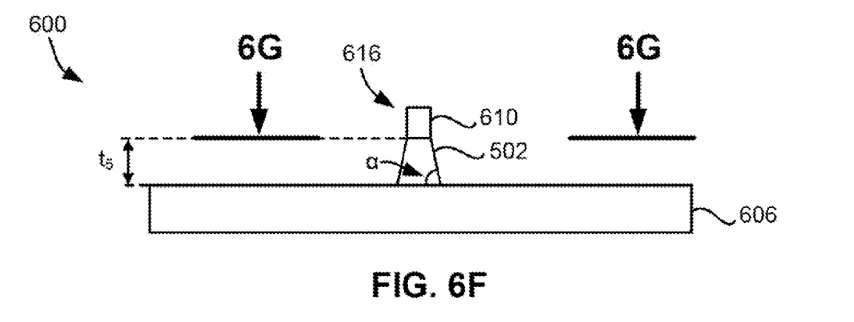

FIG. 6F illustrates the result of performing a third subtractive process to define the sensor structure 502 from the thin film stack of sensor materials 608 using the milling mask 616. According to one approach, the third subtractive process may include ion milling to form the sensor structure 502. Preferably, the milling angle is between about 0 and about 20 degrees from orthogonal to the deposition plane of the sensor materials 608. However, according to various other approaches, the third subtractive process may include any of the process steps described above in the first and/or second subtractive process, and/or a process which would be apparent to one skilled in the art upon reading the present description. According to different designs, an average spacing value $S_2$ between the sidewalls of the sensor structure 502 in the track width direction X along the bottom thereof may be between about 3 nm and about 50 nm, but could be higher or lower depending on the desired embodiment. Furthermore, the thickness $t_5$ of the sensor structure 502 may be from about 10 nm to about 50 nm, more preferably from about 5 nm to about 40 nm, but may be higher or lower depending on the desired embodiment. As described above, the reduced thickness of the sensor structure allows for sharper transitions when reading data. Thus, by implementing the process steps of FIGS. 6A-6F, performance of the sensor structure 502 is improved.

Figure 6G:
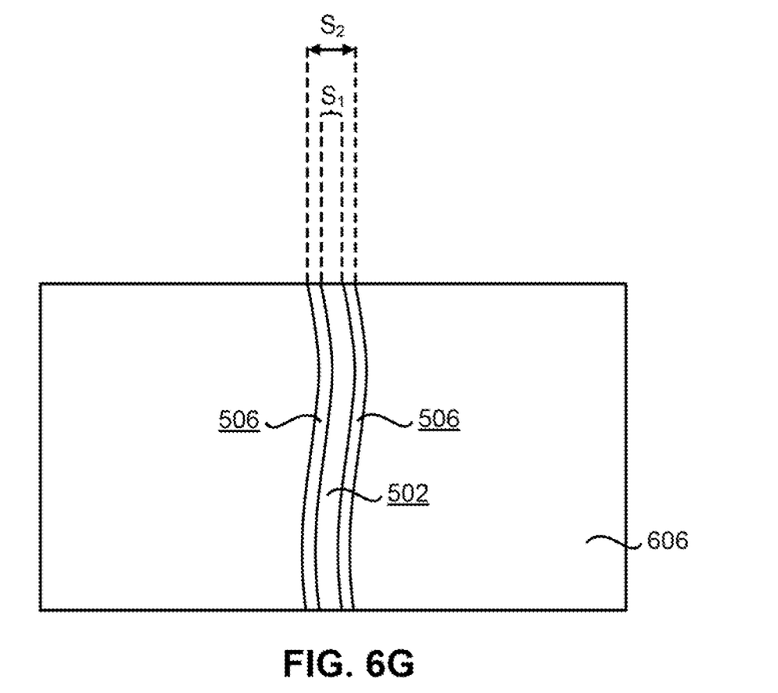
FIG. 6G is a partial top down view of FIG. 6F taken along line 6G-6G of FIG. 6F.

FIG. 6G, which is a partial top down view of the structure shown in FIG. 6F, demonstrates the uniformity of the spacing between the sidewalls 506 of the sensor structure 502. Note that the curvature of the sidewalls of the sensor structure have been exaggerated for explanatory purposes. As noted above, the LER of the original polymer mask 602 has a dramatic effect on the LER of the sensor structure via translation thereof through the various masking layers. Moreover, the conformality of the spacer film and resulting spacer, and masking layer(s) formed therewith, preferably results in the spacing between the sidewalls of the sensor structure 502 being about constant at any point along the height of the sensor structure when measured in the same plane. For example, $S_1$, $S_2$ and/or any width therebetween may be about constant when measured at any point along the height of the sensor structure 502.

According to a preferred approach, the LER of at least one of the sidewalls of the sensor structure 502 may be less than about 1.5 nm, more preferably less than about 1 nm, where "about" signifies±20% of the referenced value for any value used herein, unless otherwise defined.

Again, as described above, the process steps illustrated in FIGS. 6A-6F allow for the sidewalls of the resulting sensor structure to have increased verticality, thereby improving functionality. In a preferred embodiment, the average angle α of the sensor sidewall from horizontal is between about 80 and 90 degrees.

The milling mask 616 may be removed using any conventional process, and additional layers may be formed over the sensor structure 502 and shield 606. Depending on the desired embodiment, different process steps and/or configurations may be incorporated with the magnetic head 600 and/or fabrication thereof. Looking to the embodiment depicted in FIGS. 5A-5B, the magnetic head 600 of FIG. 6F may include an insulating layer 518, hard bias layer 520 and/or second shield 522, e.g., using any process steps described above, and/or any of those which would be apparent to one skilled in the art upon reading the present description.

Furthermore, in addition to those presented above, an additional process step(s) may be performed in which excess portions of the magnetic head formed may be cut away, e.g., using masked etching, etc. to define the height thereof and/or the ABS.

Unless otherwise indicated herein, any of the process steps, materials, etc. may be of a type known in the art.

It should be noted that methodology presented herein for at least some of the various embodiments may be implemented, in whole or in part, in computer hardware, software, by hand, using specialty equipment, etc. and combinations thereof.

Moreover, any of the structures and/or steps may be implemented using known materials and/or techniques, as would become apparent to one skilled in the art upon reading the present specification.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A magnetic head, comprising:
   a sensor structure extending from an air bearing surface end thereof in a stripe height direction,
   the sensor structure having sidewalls on opposite sides thereof,
   the sidewalls extending between a top and a bottom of the sensor structure;
   the sidewalls extending in the stripe height direction,
   wherein a spacing between the sidewalls in a track width direction along the top of the sensor structure is about constant therealong in the stripe height direction.

2. The magnetic head as recited in claim 1, wherein a line edge roughness of at least one of the sidewalls of the sensor structure is less than about 1.5 nm.

3. The magnetic head as recited in claim 1, wherein a line edge roughness of at least one of the sidewalls of the sensor structure is less than about 1 nm.

4. The magnetic head as recited in claim 1, wherein a spacing between the sidewalls in the track width direction along the bottom of the sensor structure is about constant therealong in the stripe height direction.

5. A magnetic head, comprising:
   a sensor structure extending from an air bearing surface end thereof in a stripe height direction,
   the sensor structure having sidewalls on opposite sides thereof,
   the sidewalls extending between a top and a bottom of the sensor structure;
   the sidewalls extending in the stripe height direction,
   wherein a spacing between the sidewalls in a track width direction along the top of the sensor structure is about constant therealong in the stripe height direction,
   wherein an average width of the sensor structure in the track width direction along the bottom thereof is between about 3 and about 50 nm.

6. A magnetic data storage system, comprising:
   at least one magnetic head as recited in claim 1;
   a magnetic medium;
   a drive mechanism for passing the magnetic medium over the at least one magnetic head; and
   a controller electrically coupled to the at least one magnetic head for controlling operation of the at least one magnetic head.

7. A method for forming the magnetic head of claim 1, the method comprising:
   forming a polymer mask with a line edge roughness of less than about 1.5 nm above a substrate, the substrate including a thin film stack of sensor materials and a milling mask layer;
   depositing a spacer film above the polymer mask and exposed portions of the substrate using a conformal deposition process;
   performing a first subtractive process to define a spacer from the spacer film;
   performing a second subtractive process to define a milling mask from the milling mask layer using the spacer; and
   performing a third subtractive process to define a sensor structure from the thin film stack of sensor materials using the milling mask.

8. The method as recited in claim 7, wherein the polymer mask is formed by imprinting.

9. A magnetic head, comprising:
   a sensor structure extending from an air bearing surface end thereof in a stripe height direction,
   the sensor structure having sidewalls on opposite sides thereof, the sidewalls extending between a top and a bottom of the sensor structure;

the sidewalls extending in the stripe height direction, wherein a line edge roughness of at least one of the sidewalls of the sensor structure is less than about 1.5 nm.

10. The magnetic head as recited in claim 9, wherein a line edge roughness of at least one of the sidewalls of the sensor structure is less than about 1 nm.

11. The magnetic head as recited in claim 9, wherein a spacing between the sidewalls in a track width direction along the top of the sensor structure is about constant therealong in the stripe height direction.

12. The magnetic head as recited in claim 9, wherein a spacing between the sidewalls in a track width direction along the bottom of the sensor structure is about constant therealong in the stripe height direction.

13. A magnetic data storage system, comprising:

at least one magnetic head as recited in claim 9;

a magnetic medium;

a drive mechanism for passing the magnetic medium over the at least one magnetic head; and a controller electrically coupled to the at least one magnetic head for controlling operation of the at least one magnetic head.

14. A method for forming the magnetic head of claim 9, the method comprising:

forming a polymer mask with a line edge roughness of less than about 1.5 nm above a substrate, the substrate including a thin film stack of sensor materials and a milling mask layer;

depositing a spacer film above the polymer mask and exposed portions of the substrate using a conformal deposition process;

performing a first subtractive process to define a spacer from the spacer film;

performing a second subtractive process to define a milling mask from the milling mask layer using the spacer; and performing a third subtractive process to define the sensor structure from the thin film stack of sensor materials using the milling mask.

15. The method as recited in claim 14, wherein the polymer mask is formed by imprinting.

16. The magnetic head as recited in claim 1, wherein an average angle of each sidewall relative to the track width direction is between about 80 and about 90 degrees.

17. The magnetic head as recited in claim 5, wherein a line edge roughness of at least one of the sidewalls of the sensor structure is less than about 1 nm.

18. The magnetic head as recited in claim 5, wherein a spacing between the sidewalls in the track width direction along the bottom of the sensor structure is about constant therealong in the stripe height direction.

* * * * *